United States Patent [19]

Silverblatt

[11] Patent Number: 4,572,817
[45] Date of Patent: Feb. 25, 1986

[54] PLUMB NOZZLE FOR NUCLEAR FUEL ASSEMBLY

[75] Inventor: Bernard L. Silverblatt, Mt. Lebanon, Pa.

[73] Assignee: Westinghouse Electric Corp., Pittsburgh, Pa.

[21] Appl. No.: 538,041

[22] Filed: Sep. 30, 1983

[51] Int. Cl.⁴ .............................................. G21C 3/30
[52] U.S. Cl. .................................. 376/409; 376/261; 376/434
[58] Field of Search .............. 376/444, 352, 446, 364, 376/435, 362, 365, 313, 261

[56] References Cited

U.S. PATENT DOCUMENTS

| | | | |
|---|---|---|---|
| 3,060,111 | 10/1962 | Sherman et al. | 376/435 |
| 3,086,934 | 4/1963 | Morrison | 204/193.2 |
| 3,201,318 | 8/1965 | Dickinson | 176/30 |
| 3,255,091 | 6/1966 | Frisch | 376/446 |
| 3,317,399 | 5/1967 | Winders | 376/435 |
| 3,356,578 | 12/1967 | Dryland et al. | 176/40 |
| 3,389,056 | 6/1968 | Frisch | 376/364 |
| 3,567,577 | 3/1971 | Brooks | 176/30 |
| 4,096,032 | 6/1978 | Mayers et al. | 376/260 |
| 4,236,966 | 12/1980 | Savin et al. | 176/30 |
| 4,446,099 | 5/1984 | Schwind et al. | 376/313 |

FOREIGN PATENT DOCUMENTS

| | | | |
|---|---|---|---|
| 2823433 | 1/1979 | Fed. Rep. of Germany | 376/313 |
| 129284 | 10/1979 | Japan | 376/352 |

*Primary Examiner*—Deborah L. Kyle
*Assistant Examiner*—Richard W. Wendtland
*Attorney, Agent, or Firm*—Daniel C. Abeles

[57] ABSTRACT

A plumb nozzle for a nuclear fuel assembly having asymmetric loading of the fuel mass comprising a raised protuberance on the handling tool gripper finger engaging surface of the nozzle to compensate for skewing caused by the asymmetric fuel loading. The protuberance is positioned to be engaged by a gripper finger during handling, loading, or unloading of the fuel assemblies and extends downwardly a predetermined distance with respect to the other gripper finger engaging surfaces so that the fuel assembly hangs plumb.

6 Claims, 3 Drawing Figures

PLUMB NOZZLE FOR NUCLEAR FUEL ASSEMBLY

BACKGROUND OF THE INVENTION

1. Field of the Invention:

The invention relates to nuclear fuel assemblies of the elongated type wherein nuclear reactor fuel in solid form is contained within a protective sheath, and more particularly to such a fuel assembly for use in light water reactors, wherein the assemblies are positioned with their longitudinal axes substantially parallel to the normal vertical axes, the nozzle of each fuel assembly being provided with compensators to compensate for an out-of-plumb, or skewed, position during lifting and handling, such as in loading and unloading of the reactor core.

2. Description of the Prior Art:

In recent development of replacement fuel assemblies for light water reactors, a particular fuel element design feature has resulted in asymmetric mass distribution in the radial blanket fuel to achieve advantages over present designs. Such asymmetric mass distribution, although desirable, causes the fuel to hang skewed from the handling tool, rather than plumb with respect to the central axis of the core. It has been calculated that such fuel assemblies having a length of approximately 160 inches and supported at the top nozzle would be displaced approximately ½ inch at the bottom from a plumb line passing through the central axis of the fuel assembly at the top. In certain positions in the radial blanket, such as at the blanket edge, a blanket edge fuel assembly will hang out of plumb in only one coordinate direction, whereas in another position, such as the blanket corner, a blanket corner fuel assembly will hang out-of-plumb in two coordinate directions.

A skewed position of the type described above could make it difficult to unload and reload this type of fuel because several fuel assemblies would have to be put in temporary positions in the core and excess fuel movements would have to be made to guide these radial blanket assemblies down on the lower core support hinge. This would increase the opportunity for fuel assembly damage during fuel insertion. Therefore, special handling precautions would have to be used with any movement of the radial blanket fuel assemblies in or out of the core. An additional problem encountered with this fuel design is increased bowing in the later life of the assemblies, due to their uneven weight distribution, which could make it extremely difficult for them to move in and out of the core through a complete life cycle. All these previously mentioned problems result in increased time consumption for extra handling precautions and increased numbers of fuel handling operations which it has been estimated could double the time it now requires to complete a refueling operation. Similar handling problems would be experienced in withdrawing the skewed fuel assemblies into the refueling machine mast which would also significantly increase refueling time. Such increases in refueling time, for example, are extremely undesirable since they increase man-rem exposure to the crew and result in longer periods of plant off-line times.

Known fuel assembly handling devices, such as that shown in U.S. Pat. No. 4,236,966, are normally insertable into the upper nozzle portion of the fuel assembly and have gripper devices on the inserted ends which grip under shoulder portion, for example, on the nozzle or end of the fuel element assembly, for handling the fuel assembly during insertion or withdrawal from a reactor core, storage basin, or fuel transfer device, for example. However, such devices have no means for compensating for fuel elements, or fuel assemblies, which would not hang vertically on the handling tool due to uneven weight distribution but instead would hang out-of-plumb, thus imposing the problems pointed out above during insertion and withdrawal.

SUMMARY OF THE INVENTION

It is an object of the present invention to overcome the above problems in handling skewed fuel assemblies by providing a novel design of the fuel nozzle which compensates for the out-of-plumb characteristics of the type of fuel assembly in question. This compensating is provided by a raised portion, or protuberance, on the lower gripping finger pick-up surface on the upper nozzle positioned on the pickup surface at the location where the lower gripping end of the gripper fingers will engage it in the position in which the fuel assembly is supported or suspended, by the upper end nozzle. The compensating protuberance is provided on the gripper finger pickup surface of the nozzle on the side in the direction opposite the offset from the plumb position. The protuberance functions by offsetting the contacting surface of the gripping finger therewith with respect to the plane of the gripping surfaces of the other gripping fingers which engage those sides of the gripper finger pick-up surface which do not contain the protuberance. The thickness of the protuberance or offset from the normal finger pick-up surface is predetermined by the amount of the offset, or out of plumb, of the geometric center of the fuel assembly from the longitudinal axis thereof if vertical. Thus, by compensating for the out-of-plumb, skewed, position of the fuel assembly, due to the asymmetric mass thereof, applicant's invention provides a simple and effective structural feature which may be machined into the gripper finger pick-up surface of the nozzle and which will in use assure that the fuel assembly is held in the plumb position for loading and unloading into a reactor core by a handling tool while supported in the core. This compensating device on applicant's novel end nozzle prevents damage to the fuel assembly and other reactor core components during loading and unloading of the fuel assemblies and avoids the necessity for excess fuel movement which would be necessary to guide skewed fuel assemblies down on the lower core support pins, which would afford an increased opportunity for fuel assembly damage to occur during fuel insertion. Applicant's invention further avoids the necessity for special handling procedures and precautions which would have to be used with any movement of the fuel assemblies in or out of the core if hung in a skewed position. Applicant's invention is also a great advantage in that it avoids the necessity for changing the design for the handling tools and the grippers to compensate for the skewed conditions during lifting, particularly since there are three different kinds of fuel assemblies, viz. skew to one axis, skew to two axes, and straight hanging assemblies in each reactor core. Tool changes, even if they can be developed, would be complicated and expensive.

BRIEF DESCRIPTION OF THE DRAWINGS

The invention will now be described in greater detail with reference to the accompanying drawings wherein.

DESCRIPTION OF THE PREFERRED EMBODIMENT

Figure 1:
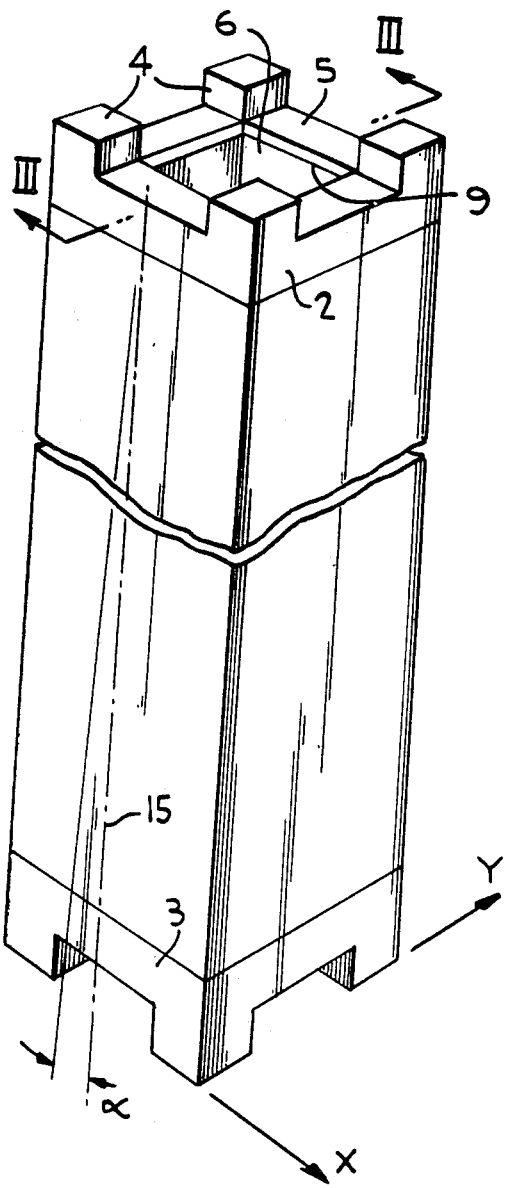
FIG. 1 is a schematic perspective elevational view of a fuel element and a nozzle therefor embodying the invention.

A fuel element assembly of the type for which the invention was made is shown schematically in FIG. 1 as an elongated assembly of fuel elements (not shown in detail) which may be in the form of fuel rods supported at their ends by nozzles 2 and 3. The form of support is not shown since it is no part of the invention and will be readily understood by anyone skilled in this art. The upper nozzle 2 is rectangular and box-shaped in the embodiment illustrated and supports the upper ends of the fuel elements and has posts or abutments 4 extending upwardly from the corners of the upper surface of the nozzle. The upper end 5 of the nozzle is a planar element having the thickness required to support the fuel assembly when suspended by the fuel handling tool as will appear hereinafter.

Figure 2:
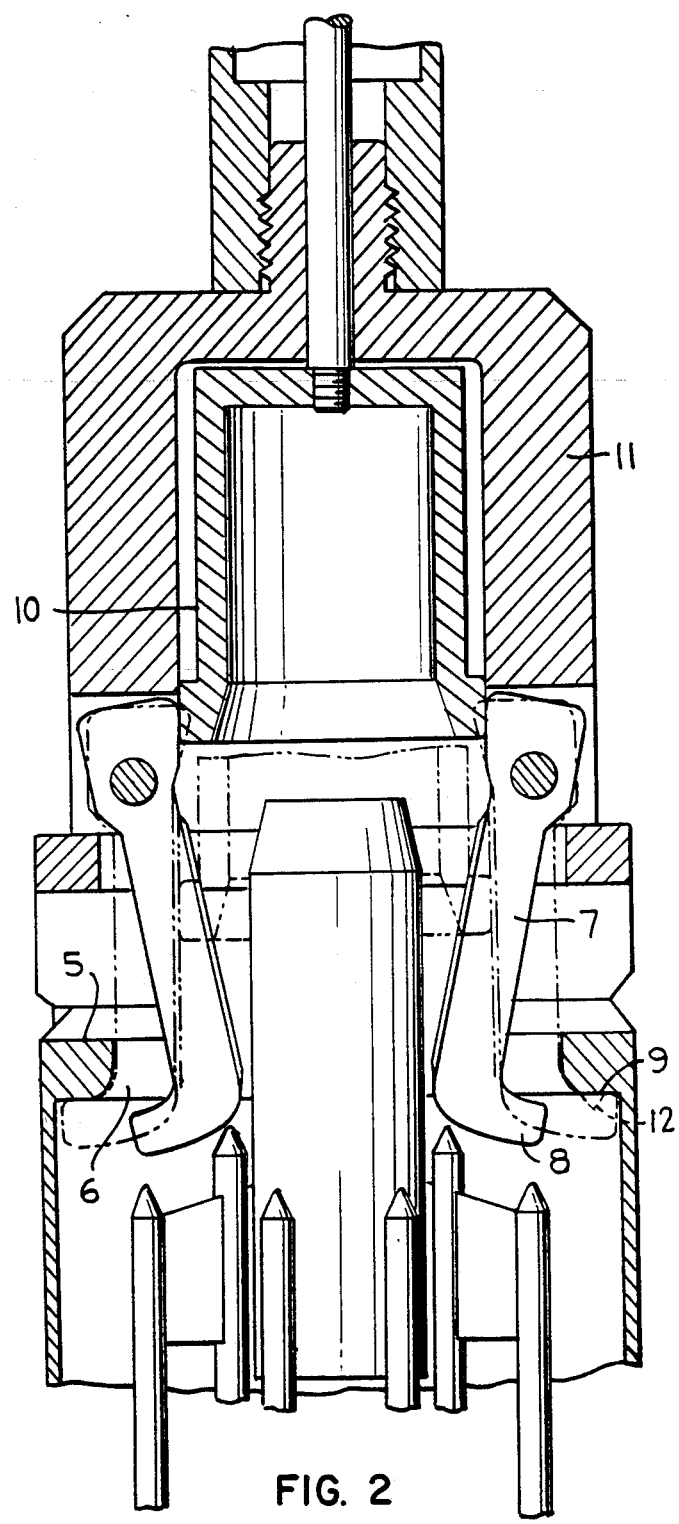
FIG. 2 is a schematic cross-sectional view showing a typical fuel element handling tool inserted into the end of the fuel element nozzle with the gripper fingers in the disengaged position in solid lines and in the engaged position in broken lines.

The upper end 5 has an aperture 6 therethrough for coolant flow and into and through which the gripper end of a fuel handling tool may be inserted for engaging the fuel assembly for insertion or removal from a nuclear reactor core. A schematic illustration of a typical tool is shown in the inserted position in FIG. 2. The gripper fingers 7 are shown disengaged in solid lines and in the engaged position in phantom. It will be observed that radially movable gripper fingers 7 have hooklike ends 8 for engaging the lower surface, or gripper finger pick-up surface 9 of the upper end 5 of the nozzle. This lower surface is planar and extends around all four sides of the aperture 6 so that it can be engaged by all fingers 7, 8 to suspend the fuel assembly with its longitudinal axis substantially vertical, or plumb, during insertion and removal. After insertion of the gripper end of the handling tool into the nozzle, the gripper fingers are radially moved into the engaging position by action of an axially movable element 10 of the handling tool 11 in the manner which will be readily seen by the broken lines of FIG. 2.

Assuming the mass of the fuel assembly is geometrically centered or symmetrical, it will be apparent that the fuel assembly will hang vertical or plumb from the handling tool when suspended therefrom. The fuel assembly is supported by the lower surface 9 of the upper nozzle and therefore will be plumb in the core if the mass is geometrically centered. However, if the mass distribution of the fuel assembly is asymmetric, it will hang out of plumb, or skewed, from the handling tool in the core, which would present difficulty during loading and unloading of the reactor core due to interference with other fuel elements and structural elements of the fuel core. In addition, a further problem could be caused by the probability that the fuel assemblies could develop increased bowing later in life, due to their uneven weight distribution, which could make it impossible for them to be moved in or out of the reactor core through a complete life cycle.

Figure 3:
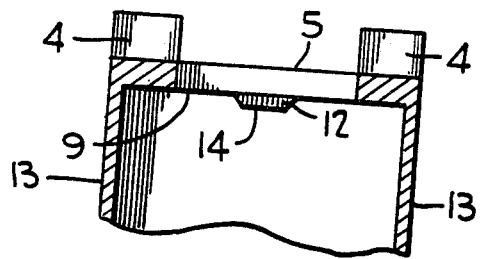
FIG. 3 is a cross-sectional view taken along line III—III of FIG. 1 showing the invention.

Applicant's invention overcomes these problems by providing a raised section or protuberance 12 extending from the lower surface 9 of end 5 of the nozzle at the location where this surface is engaged by the gripper finger 8. This raised section on the gripper finger pick-up surface is clearly shown in FIG. 3 and in this embodiment is substantially centrally located on the lower surface 9 between the sides 13 of the nozzle. It is also positioned between the inner edge of the aperture 6 and the adjacent side of the nozzle. When one raised section 12 is provided and the gripper fingers 7 of the handling tool are expanded into the engaging position, the hook end 8 will engage under the lower flat surface 14 of the raised section so that the gripper surface will be offset with respect to the plane of the other gripping surface on the finger. Therefore, when the gripper is raised to support the fuel assembly, this offset will compensate for the offset due to the asymmetric mass and the fuel assembly will be held plumb.

In a typical embodiment of this invention, a fuel assembly having an overall length of approximately 160 inches from the outer end surface of the upper and lower posts 4, and an asymmetric mass of an amount for which this invention is intended, the lower end will hang out-of-plumb approximately ½ inch, i.e., the geometric center at the bottom will be displaced ½ inch with respect to the longitudinal axis of the fuel assembly if vertical as shown by the angle in FIG. 1; the true vertical being shown at 15. For this out-of-plumb displacement, the thickness of protuberance 12, or the distance of surface 14 from surface 9, should be approximately 0.020 inches, to compensate for the out-of-plumb displacement and prevent skewing of the fuel assembly.

In the above-illustrated embodiment of the invention, the compensating protuberance is shown as one gripper finger engaging surface 9 where the fuel assembly will hang out-of-plumb in only one coordinate direction X. However, for certain positions in the reactor core, such as in a blanket corner fuel assembly, the latter will hang out of plumb in two coordinate directions, X and Y. In that case, compensating protuberances are provided on two adjacent gripper finger pick-up surfaces 9 to support the fuel assembly in the plumb position. The raised sections, or protuberances 12, can be produced by machining the surfaces 9, or by attaching separate members by welding, for example.

It is not applicant's intention to limit his invention to the specific embodiments described, but only to the scope of the appended claims.

I claim:

1. An elongated nuclear reactor fuel assembly having an asymmetric weight distribution across a cross section thereof, including a nozzle affixed to one end of the fuel assembly having a plurality of lifting surfaces formed thereon on which the fuel assembly can be supported when suspended from said surfaces, at least one of said lifting surfaces being located at a first elevation relative to the longitudinal axis of the fuel assembly, and a second of said lifting surfaces being located at a second elevation different from said first elevation wherein the difference in said first and second elevations is sized to offset said asymmetric weight distribution when the fuel assembly is supported from said first and second surface so that when so supported the fuel assembly will hang plumb.

2. The nuclear reactor fuel assembly of claim 1 wherein said lifting surfaces are located substantially equidistant from the longitudinal axis of the fuel assembly.

3. The fuel assembly of claim 1 wherein the difference in said first and second elevations is established by a protuberance on the nozzle which forms the first of said lifting surfaces.

4. The fuel assembly of claim 1 wherein said nozzle is a box-shaped member having an upper side and side walls, an opening in the upper side, a plurality of ledges extending from said opening to said side walls, said lifting surfaces comprise lower surfaces of said ledges, and at least one of said lifting surfaces comprises a protuberance extending downwardly from said lower surface on the side of the nozzle opposite to the direction in which the fuel assembly tends to be out-of-plumb.

5. The fuel assembly of claim 4 wherein said protuberance has a planar, lower, lifting surface position substantially centrally on said lower surface.

6. The fuel assembly of claim 5 wherein said protuberance is provided on two adjacent said lower surfaces.

* * * * *